United States Patent
Chen

(10) Patent No.: US 9,264,425 B1
(45) Date of Patent: Feb. 16, 2016

(54) ANONYMITY AUTHENTICATION METHOD IN MULTI-SERVER ENVIRONMENTS

(71) Applicant: NATIONAL CHIN-YI UNIVERSITY OF TECHNOLOGY, Taichung (TW)

(72) Inventor: Chi-Tung Chen, Taichung (TW)

(73) Assignee: NATIONAL CHIN-YI UNIVERSITY OF TECHNOLOGY, Taichung (TW)

( * ) Notice: Subject to any disclaimer, the term of this patent is extended or adjusted under 35 U.S.C. 154(b) by 0 days.

(21) Appl. No.: 14/538,820

(22) Filed: Nov. 12, 2014

(30) Foreign Application Priority Data

Sep. 30, 2014 (TW) ............................. 103134037 A

(51) Int. Cl.
    *H04L 29/06* (2006.01)
(52) U.S. Cl.
    CPC .......... *H04L 63/083* (2013.01); *H04L 63/0869* (2013.01)
(58) Field of Classification Search
    CPC ......................... H04L 63/083; H04L 63/0869
    See application file for complete search history.

(56) References Cited

U.S. PATENT DOCUMENTS

| | | | | |
|---|---|---|---|---|
| 7,234,059 B1* | 6/2007 | Beaver | ............... | H04L 9/0833 380/283 |
| 7,987,368 B2* | 7/2011 | Zhu | ............... | H04L 63/0407 713/156 |
| 8,464,058 B1* | 6/2013 | Chen | ............... | H04L 9/0844 380/284 |
| 8,707,046 B2* | 4/2014 | Walker | ............... | H04L 9/0844 713/150 |
| 9,021,265 B1* | 4/2015 | Chen | ............... | H04L 9/0844 713/169 |
| 2004/0260926 A1* | 12/2004 | Arditti Modiano | ... | H04L 9/3255 713/170 |
| 2006/0095291 A1* | 5/2006 | Cherney | ............... | G06F 21/31 705/44 |
| 2007/0280481 A1* | 12/2007 | Eastlake | ............... | H04W 12/04 380/277 |
| 2012/0005732 A1* | 1/2012 | Shinzaki | ............... | G06F 21/32 726/6 |
| 2012/0023334 A1* | 1/2012 | Brickell | ............... | H04L 9/0844 713/169 |
| 2013/0212249 A1* | 8/2013 | Groat | ............... | H04L 9/16 709/223 |
| 2014/0173281 A1* | 6/2014 | Hwang | ............... | H04L 9/3281 713/171 |

* cited by examiner

*Primary Examiner* — Chau Le
(74) *Attorney, Agent, or Firm* — CKC & Partners Co., Ltd.

(57) ABSTRACT

An anonymity authentication method in multi-server environments is provided. When a user switches between various remote servers, it is not necessary to perform many times of complicated verification procedures, only a set of user identity and password is required for switching between the different remote servers. Moreover, the operation of the transmitted messages uses only hash function and XOR operator, and a random number is also applied thereto. Therefore, the anonymity authentication method of the present disclosure has high computational efficiency and high security.

7 Claims, 4 Drawing Sheets

$U_i$ input $ID_i, PW_i$
$L_i = W_i \oplus h(ID_i \| h(r \oplus PW_i))$
$F_i^* = h(L_i)$
$F_i^* \stackrel{?}{=} F_i$
generates $N_i$
$M_i = E_i \oplus h(r \oplus PW_i)$
$R_i = h(h(r \oplus PW_i))$
$G_{ij} = R_i \oplus h(h(y) \| N_i \| SID_j)$
$CID_i = h(r \oplus PW_i) \oplus h(L_i \| M_i \| N_i)$
$H_{ij} = L_i \oplus h(M_i \| N_i \| SID_j)$
$Z_i = h(E_i \| M_i \| N_i)$ $S_j$

Fig. 2A

ANONYMITY AUTHENTICATION METHOD IN MULTI-SERVER ENVIRONMENTS

RELATED APPLICATIONS

The application claims priority to Taiwan Application Serial Number 103134037, filed on Sep. 30, 2014, which is herein incorporated by reference.

BACKGROUND

1. Technical Field

The present disclosure relates to an authentication method in a server environment, especially relates to an anonymity authentication method in multi-server environments.

2. Description of Related Art

With the technology development and generalization on the Internet, various kinds of services are provided by various kinds of remote servers.

Conventionally when a user attempts to login in various kinds of remote servers for obtaining various services, different identities and passwords are required for authentication. Therefore it is inconvenient for the user to use the service.

Moreover, providing a security verification procedure is an important manner. Conventionally many authentication methods are available. However, in these methods, there still exists many holes, and may be attacked by the hackers. For achieving high security, the message operation and transmission procedures are so complicated that leading to low efficiency and high cost.

SUMMARY

According to one aspect of the present disclosure, an anonymity authentication method in multi-server environment includes a registration procedure, a login procedure, and a verification procedure.

The registration procedure is for registering a user to a registration center, the registration procedure includes:

in the user's side:

an user identity (user ID) and a password is chosen by the user, and a random number is freely chosen by the user;

an XOR operation is performed between the random number and the password chosen by the user and then a hash operation is performed for generating a first hash value;

the user ID and the first hash value is transmitted to the registration center by the user for performing the registration procedure;

in the registration center's side:

a hash operation is performed to the first hash value for generating a second hash value;

a string concatenation is performed to a master key and a secret number chosen by the registration center, and then a hash operation is performed, and then a string concatenation is performed with the second hash value, and finally a hash operation is performed for generating a third hash value;

an XOR operation is performed to the third hash value and the first hash value for generating a first output value;

a hash operation is performed to the user ID and the master key for generating a fourth hash value;

a string concatenation operation is performed to the user ID and the first hash value, and then a hash operation is performed, and then an XOR operation is performed with the fourth hash value for generating a second output value;

a hash operation is performed to the fourth hash value for generating a fifth hash value;

a hash operation is performed to the secret number for generating a sixth hash value;

the registration center transmits the second output value, the first output value, the fifth hash value, a one-way hash value and the sixth hash value to a smart card of the user;

the user inputs the random number to the smart card, and the smart card contains the second output value, the first output value, the fifth hash value, the random number, the one-way hash value and the sixth hash value.

The login procedure is for the user to login to a remote server. The login procedure includes:

the user inputs the user identity and the password chosen by the user to the smart card;

at the smart card:

an XOR operation and then a hash operation are performed to the random number and the password, then a string concatenation operation is performed with the user identity, and a hash operation is performed, and then an XOR operation is performed with the second output value for generating a third output value;

a hash operation is performed to the third output value for generating a seventh hash value;

the seventh hash value is compared with the fifth hash value, if the seventh hash value is equal to the fifth hash value, the user is authenticated; if the seventh hash value is not equal to the fifth hash value, the smart card rejects the login procedure, if the seventh hash value is equal to the fifth hash value, then at the smart card:

a user nonce is generated;

an XOR operation is performed to the first hash value and the first output value for generating a fourth output value;

a hash operation is performed to the first hash value for generating an eighth hash value;

an string concatenation operation and then a hash operation are performed to the sixth hash value, the user nonce and a remote server identity, and then an XOR operation is performed with the eighth hash value for generating a fifth output value;

an string concatenation operation and then a hash operation are performed to the third output value, the fourth output value and the user nonce, and then an XOR operation is performed with the first hash value for generating a dynamic user identity;

a hash operation is performed to the remote server identity, the user nonce and the fourth output value, and then an XOR operation is performed to the third output value for generating a sixth output value;

a string concatenation operation and then a hash operation are performed to the first output value, the fourth output value and the user nonce for generating a ninth hash value;

a first parameter set is issued to the remote server by the user, wherein the first parameter set includes the dynamic user identity, the fifth output value, the sixth output value, the ninth hash value and the user nonce.

The verification procedure is for performing a mutual authentication between the user and the remote server, the verification procedure includes:

the first parameter set is received by the remote server;

at the remote server:

an string concatenation operation and then a hash operation are performed to the sixth hash value, the user nonce and the remote server identity, and then an XOR operation is performed with the fifth output value for generating a seventh output value;

a string concatenation operation and then a hash operation are performed to the master key and the secret number selected by the registration center, and then a string concatenation operation is performed with the seventh output value, and then a hash operation is performed for generating a tenth hash value;

a string concatenation operation and then a hash operation are performed to the tenth hash value, the user nonce and the remote server identity, and then an XOR operation is performed with the sixth output value for generating an eighth output value;

a string concatenation operation and then a hash operation are performed to the eighth output value, the tenth hash value and the user nonce, and then an XOR operation is performed with the dynamic user identity for generating a eleventh hash value;

an XOR operation is performed to the eleventh hash value and the tenth hash value for generating a ninth output value;

a string concatenation operation and then a hash operation are performed to the ninth output value, the tenth hash value and the user nonce for generating a twelfth hash value;

the twelfth hash value is compared with the ninth hash value, if the twelfth hash value is not equal to the ninth hash value, the remote server rejects the login procedure, if the twelfth hash value is equal to the ninth hash value, then the following procedures are performed;

a remote server nonce is generated by the remote server, and a string concatenation operation and then a hash operation are performed to the ninth output value, the user nonce, the tenth hash value and the remote server identity for generating a thirteenth hash value;

a second parameter set is transmitted to the user by the remote server, wherein the second parameter set includes the thirteenth hash value and the remote server nonce;

after receiving the second parameter set, the user performs the following procedures for verifying the remote server:

a string concatenation operation and then a hash operation are performed to the first output value, the user nonce, the fourth output value and the remote server identity for generating a fourteenth hash value;

the fourteenth hash value is compared with the thirteenth hash value, if the fourteenth hash value is not equal to the thirteenth hash value, the user rejects to receive the second parameter set, if the fourteenth hash value is equal to the thirteenth hash value, the remote server identity is verified, and then the following procedures are performed:

a string concatenation operation and then a hash operation are performed to the first output value, the remote server nonce, the fourth output value and the remote server identity for generating a fifteenth hash value;

a third parameter set is transmitted to the remote server by the user, wherein the third parameter set includes the fifteenth hash value;

after receiving the third parameter set by the remote server, the remote server performs the following procedures for verifying the user:

a string concatenation operation and then a hash operation are performed to the ninth output value, the remote server nonce, the tenth hash value and the remote server identity for generating a sixteenth hash value;

the sixteenth hash value is compared with the fifteenth hash value, if the sixteenth hash value is not equal to the fifteenth hash value, the remote server rejects to receive the third parameter set, and terminates a session between the remote server and the user; if the sixteenth hash value is equal to the fifteenth hash value, the user is verified;

after finishing the mutual verification procedure between the user and the remote server, a session key is established between the user and the remote server, wherein the session key of the remote server is obtained by performing a string concatenation operation and then a hash operation to the ninth output value, the user nonce, the remote server nonce, the tenth hash value and the remote server identity; and the session key of the user is obtained by performing a string concatenation operation and then a hash operation to the first output value, the user nonce, the remote server nonce, the fourth output value and the remote server identity. In the session key, the ninth output value is equal to the first output value, and the tenth hash value is equal to the fourth output value.

BRIEF DESCRIPTION OF THE DRAWINGS

The disclosure can be more fully understood by reading the following detailed description of the embodiment, with reference made to the accompanying drawings as follows:

FIG. 2A is schematic view showing a login and verification procedure of the anonymity authentication method in multi-server environments according to one embodiment of the present disclosure;

DETAILED DESCRIPTION

Figure 1:
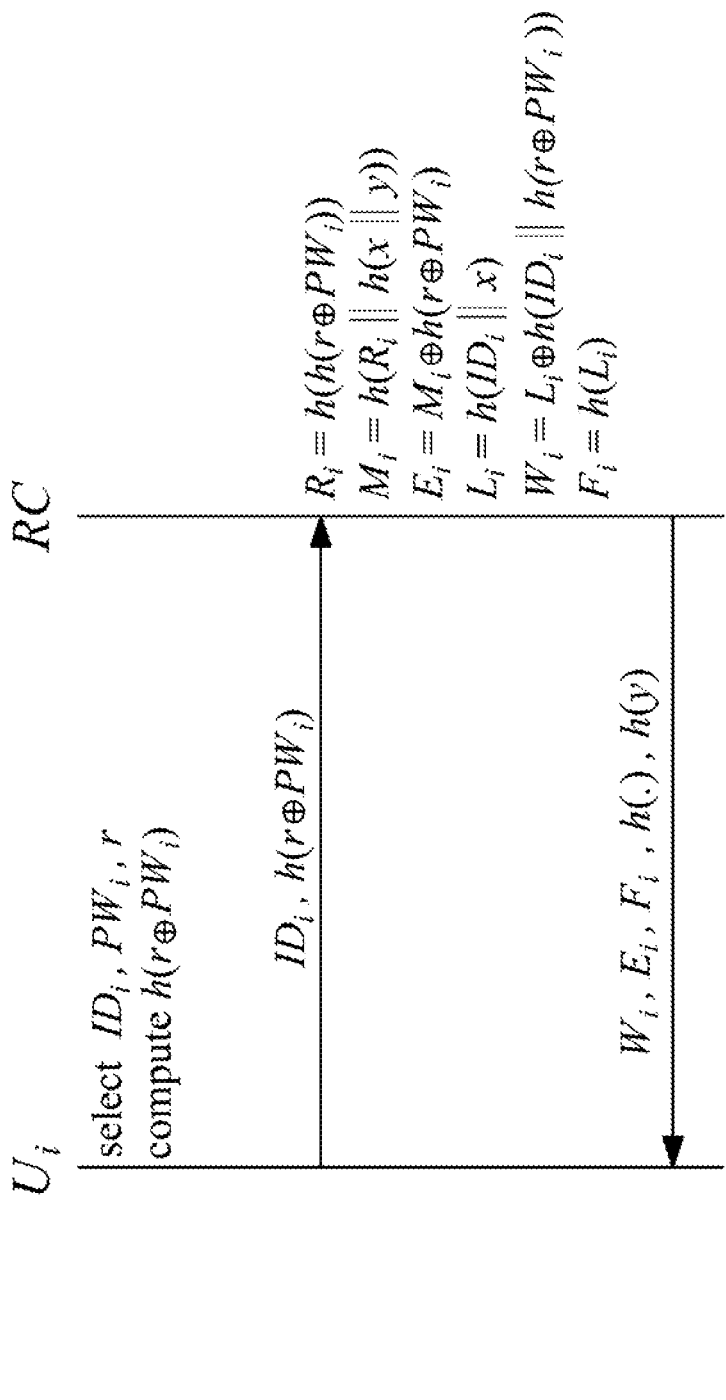
FIG. 1 is a schematic view showing a registration procedure of the anonymity authentication method in multi-server environments according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

The present disclosure provides an anonymity authentication method in multi-server environments. Using a registration center, a user can register to the registration center first with a smart card carried by the user. The registration center can transmit messages to a remote server through a secure channel. Therefore, the user can switch between different kinds of remote servers without changing password. Furthermore, in the anonymity authentication method of the present disclosure, either in a registration procedure between the user and the registration center, or a login and a mutual verification procedure between the user and the remote server, a random number is introduced for packaging the transmitted messages, thus a high security is guaranteed. Moreover, only hash function and XOR operation are used to operate the transmitted messages, thereby achieving high computational efficiency.

For clearly identifying the features of the application, the following TABLE 1 shows corresponded definition of some terms in claim language. It should be mentioned that different definition values may be corresponded to the same operation. This is due to the same operation may be performed by different participants. For example, the ninth hash value and the twelfth hash value have the same operation, but the operation is performed by different participants. When different participants perform the same operation, different definition values are used between them for the mutual authentication.

TABLE 1

| Definition | Operation | Participant |
| --- | --- | --- |
| first hash value | $h(r \oplus PW_i)$ | user |
| second hash value | $R_i = h(h(r \oplus PW_i))$ | Registration Center |
| one way hash value | $h(,)$ | Registration Center |
| third hash value | $M_i = h(R_i \| h(x\|y))$ | Registration Center |
| fourth hash value | $L_i = h(ID_i \| x)$ | Registration Center |
| fifth hash value | $F_i = h(L_i)$ | Registration Center |
| sixth hash value | $h(y)$ | Registration Center |
| seventh hash value | $F_i' = h(L_i)$ | user |
| eight hash value | $R_i = h(h(r \oplus PW_i))$ | user |
| ninth hash value | $Z_i = h(E_i \| M_i \| N_i)$ | user |
| tenth hash value | $M_i = h(R_i \| h(x\|y))$ | remote server |
| eleventh hash value | $h(r \oplus PW_i) = CID_i \oplus h(L_i \| M_i \| N_i)$ | remote server |
| twelfth hash value | $h(E_i \| M_i \| N_i)$ | remote server |
| thirteenth hash value | $V_{ij} = h(E_i \| N_j \| M_i \| SID_j)$ | remote server |
| fourteenth hash value | $h(E_i \| N_j \| M_i \| SID_j)$ | user |
| fifteenth hash value | $V_{ij}' = h(E_i \| N_j \| M_i \| SID_j)$ | user |
| sixteenth hash value | $h(E_i \| N_j \| M_i \| SID_j)$ | remote server |
| seventeenth hash value | $F_i' = h(L_i)$ | user |
| first output value | $E_i = M_i \oplus h(r \oplus PW_i)$ | Registration Center |
| second output value | $W_i = L_i \oplus h(ID_i \| h(r \oplus PW_i))$ | Registration Center |
| third output value | $L_i = W_i \oplus h(ID_i \| h(r \oplus PW_i))$ | user |
| fourth output value | $M_i = E_i \oplus h(r \oplus PW_i)$ | user |
| fifth output value | $G_{ij} = R_i \oplus h(h(y) \| N_i \| SID_j)$ | user |
| dynamic user identification | $CID_i = h(r \oplus PW_i) \oplus h(L_i \| M_i \| N_i)$ | user |
| sixth output value | $H_{ij} = L_i \oplus h(M_i \| N_i \| SID_j)$ | user |
| seventh output value | $R_i = G_{ij} \oplus h(h(y) \| N_i \| SID_j)$ | remote server |
| eighth output value | $L_i = H_{ij} \oplus h(M_i \| N_i \| SID_j)$ | remote server |
| ninth output value | $E_i = M_i \oplus h(r \oplus PW_i)$ | remote server |
| tenth output value | $L_i = W_i \oplus h(ID_i \| h(r \oplus PW_i))$ | user |
| eleventh output value | $W_i^{new} = L_i \oplus h(ID_i \| h(r^{new} \oplus PW_i^{new}))$ | user |
| twelfth output value | $E_i^{new} = E_i \oplus h(r \oplus PW_i) \oplus h(r^{new} \oplus PW_i^{new})$ | user |

FIG. 1 is a schematic view showing a registration procedure of the anonymity authentication method in multi-server environments according to one embodiment of the present disclosure.

In a multi-server environment, there are three participants, a user $U_i$, a remote server $S_j$ and a registration center RC. The anonymity authentication method in multi-server environments of the present disclosure includes a registration procedure, a login procedure, a verification procedure and a password-changing procedure.

The registration procedure is for registering a i-th user $U_i$ to a registration center RC, the registration procedure includes:

The user freely selects a random number r and chooses a user identity $ID_i$ and a password $PW_i$, and computes $h(r \oplus PW_i)$, where $h(.)$ is a hash value after operation and $\oplus$ is an XOR operator.

The user transmits $ID_i$ and $h(r \oplus PW_i)$ to the registration center through a security channel.

At the registration center, computes $R_i = h(h(r \oplus PW_i))$, $M_i = h(R_i \| h(x\|y))$, $E_i = M_i \oplus h(r \oplus PW_i)$, $L_i = h(ID_i \| x)$, $W_i = L_i \oplus h(ID_i \| h(r \oplus PW_i))$ and $F_i = h(L_i)$, where $\|$ is a string concatenation operator.

The registration center issues a secret parameter set $\{W_i, E_i, F_i, h(.), h(y)\}$ to a smart card of the user.

The user inputs the random number r to the smart card, and the smart card contains parameters $\{W_i, E_i, F_i, r, h(.), h(y)\}$.

After the aforementioned procedures, the registration procedure between the user and the registration center has been finished. And then, the user may carry the smart containing parameters $\{W_i, E_i, F_i, r, h(.), h(y)\}$ to another remote server.

Figure 2B:
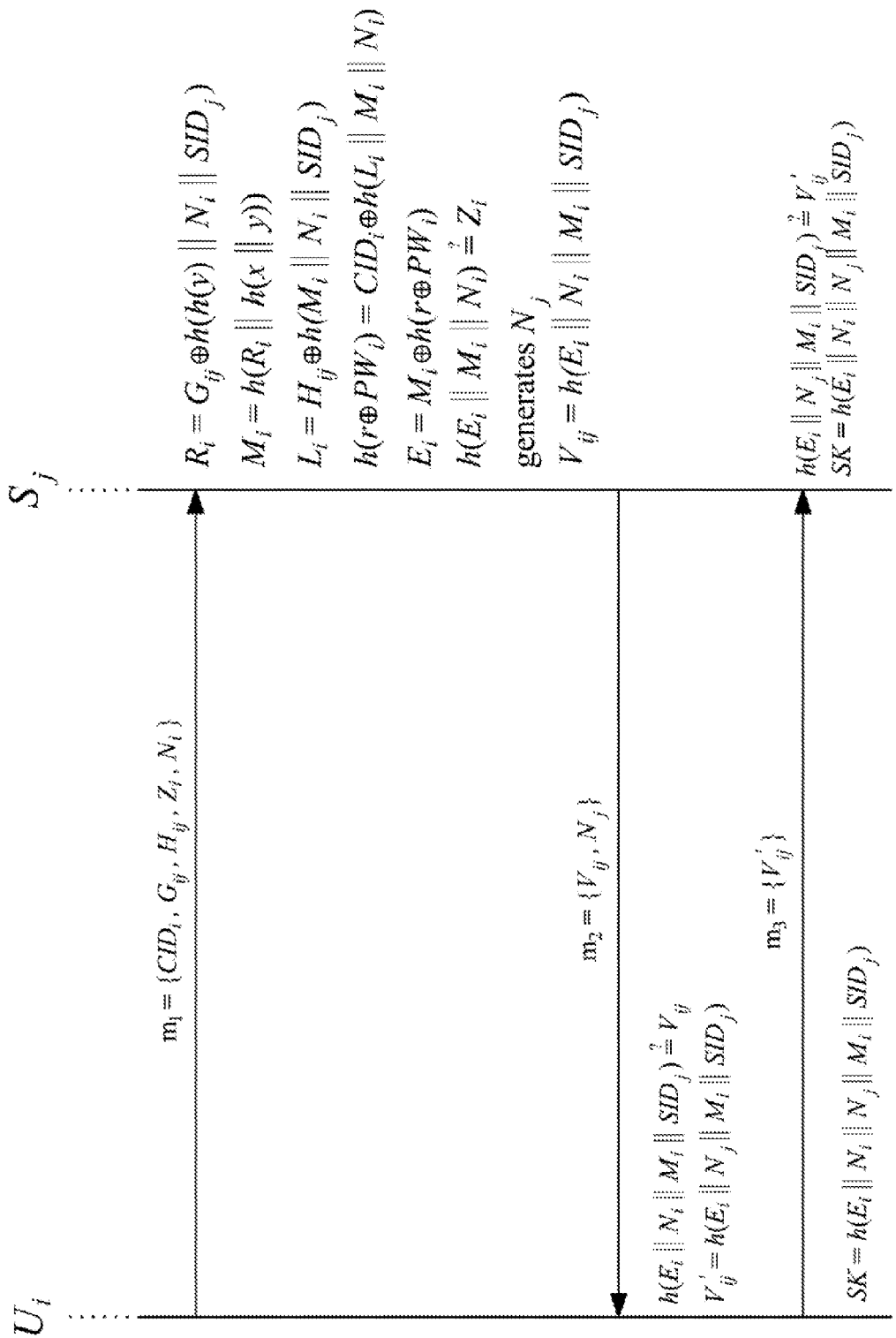
FIG. 2B is a schematic view showing a continued verification procedure of FIG. 2A.
Figure 3:
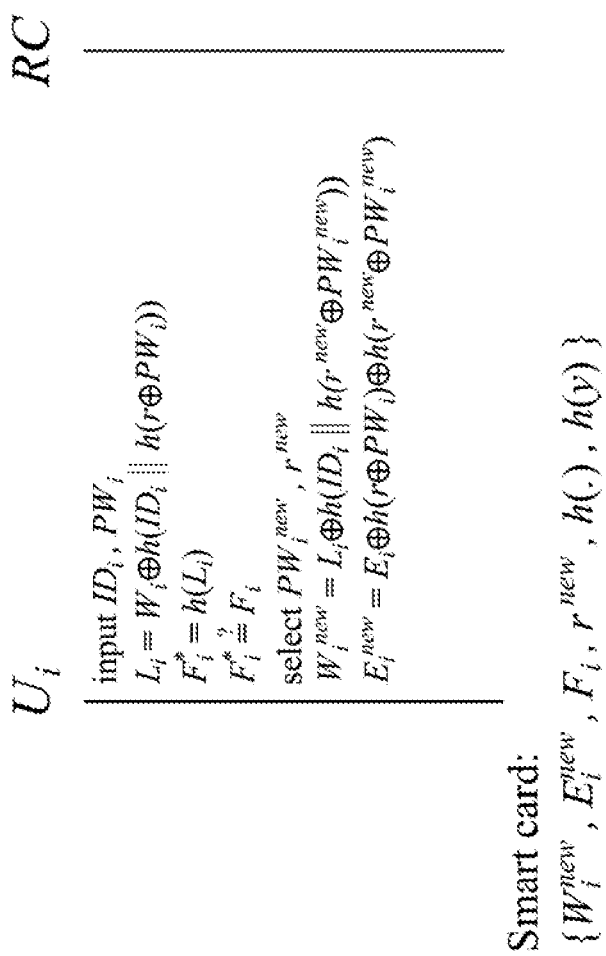
FIG. 3 is a schematic view showing a password-changing procedure according to one embodiment of the present disclosure.

FIG. 2A is schematic view showing a login and a verification procedure of the anonymity authentication method in multi-server environments according to one embodiment of the present disclosure. FIG. 2B is a schematic view showing a continued verification procedure of FIG. 2A.

The login procedure is used for the user to login to the remote server. When the user $U_i$ attempts to login the remoter server $S_j$, the user puts his smart card to a card reader, and provides $ID_i$ and $PW_i$ corresponded to the smart card.

At the smart card, computes $L_i = W_i \oplus h(ID_i \| h(r \oplus PW_i))$ and $F_i^* = h(L_i)$, and compares $F_i^*$ and $F_i$. If $F_i^*$ is equal to $F_i$, the user is authenticated. If $F_i^*$ is not equal to $F_i$, the smart card rejects the login procedure.

If $F_i^*$ is equal to $F_i$, the following procedures are performed:

A nonce $N_i$ is generated, and computes: $M_i = E_i \oplus h(r \oplus PW_i)$, $R_i = h(h(r \oplus PW_i))$, $G_{ij} = R_i \oplus h(h(y)\|N_i\|SID_j)$, $CID_i = h(r \oplus PW_i) \oplus h(L_i\|M_i\|N_i)$, $H_{ij} = L_i \oplus h(M_i\|N_i\|SID_j)$, $Z_i = h(E_i\|M_i\|N_i)$, where $SID_j$ is remote server identity, and $CID_i$ is dynamic user identity.

And then, the user transmits a first parameter set $m_1 = \{CID_i, G_{ij}, H_{ij}, Z_i, N_i\}$ to the remote server.

The verification procedure starts after the user transmits the first parameter set $m_1 = \{CID_i, G_{ij}, H_{ij}, Z_i, N_i\}$ to the remote server. The verification procedure is used for mutual authentication between the user and the remote server. The verification procedure includes the following procedures:

At the remote server, computes: $R_i = G_{ij} \oplus h(h(y)\|N_i\|SID_j)$, $M_i = h(R_i\|h(x\|y))$, $L_i = H_{ij} \oplus h(M_i\|N_i\|SID_j)$, $h(r \oplus PW_i) = CID_i \oplus h(L_i\|M_i\|N_i)$, $E_i = M_i \oplus h(r \oplus PW_i)$.

The remote server computes $h(E_i\|M_i\|N_i)$ and compares it with $Z_i$. If $h(E_i\|M_i\|N_i)$ is not equal to $Z_i$, the remote server rejects the login procedure and terminates a session between the user and the remote server. If $h(E_i\|M_i\|N_i)$ is equal to $Z_i$, the following procedure is performed.

The remote server generates a remote server nonce $N_j$, and computes $V_{ij}=h(E_i\|N_j\|M_i\|SID_j)$. The remote also transmits a second parameter set $m_2=\{V_{ij}, N_j\}$ to the user.

When the user receives $m_2$, the following procedures are performed for authenticating the remote server:

The user computes $h(E_i\|N_j\|M_i\|SID_j)$ and compares it to $V_{ij}$. If $h(E_i\|N_j\|M_i\|SID_j)$ is not equal to $V_{ij}$, the user rejects to receive the second parameter set $m_2$, and terminates the session between the user and the remote server. If $h(E_i\|N_j\|M_i\|SID_j)$ is equal to $V_{ij}$, the remote server is authenticated by the user.

And then, the user computes $V_{ij}'=h(E_i\|N_j\|M_i\|SID_j)$, and transmits a third parameter set $m_3=\{V_{ij}'\}$ to the remote server.

After receiving the third parameter set $m_3$, the remote server performs the following procedures for authenticating the user.

The remote server computes $h(E_i\|N_j\|M_i\|SID_j)$, can compares it to $V_{ij}'$. If $h(E_i\|N_j\|M_i\|SID_j)$ is not equal to $V_{ij}'$, the remote server rejects to receive the third parameter set $m_3$, and terminates the session between the user and the remote server. If $h(E_i\|N_j\|M_i\|SID_j)$ is equal to $V_{ij}'$, the user is authenticated by the remote server.

After finish the mutual verification procedure between the user and the remote server, the user and the remote server computes $h(E_i\|N_i\|N_j\|M_i\|SID_j)$ as a session key (SK), then $SK=h(E_i\|N_i\|N_j\|M_i\|SID_j)$.

Since the anonymity authentication method of the present disclosure has high security, the aforementioned login and mutual verification procedures between the user and the remote server can be performed through a common channel.

After finishing the aforementioned procedures, the registration procedure between the user and the registration center, and the login and mutual verification procedure between the user and the remote server have been finished. If the user further wants to change passwords, then the password-changing procedure can be performed as following procedures.

First, the user can put his smart card into a card reader, and provides $ID_i$ and $PW_i$. At the smart card, performs the following procedure:

The smart card computes $L_i=W_i\oplus h(ID_i\|h(r\oplus PW_i))$ and $F_i^*=h(L_i)$, and compares $F_i^*$ with $F_i$. If $F_i^*$ is not equal to $F_i$, the smart card rejects to change password by the user. If $F_i^*$ is equal to $F_i$, the user is authenticated.

And then, the user freely selects a new password $PW_i^{new}$ and a new random number $r^{new}$, and computes $W_i^{new}=L_i\oplus h(ID_i\|h(r^{new}\oplus PW_i^{new}))$, $E_i^{new}=E_i\oplus h(r\oplus PW_i)\oplus h(r^{new}\oplus PW_i^{new})$. The smart card replaces its original parameter $\{W_i, E_i, r\}$ to $\{W_i^{new}, E_i^{new}, r^{new}\}$. Finally, the smart contains $\{W_i^{new}, E_i^{new}, F_i, r^{new}, h(.), h(y)\}$ and the password-changing procedure is finished.

The aforementioned password-changing procedure can be finished alone by the user, without exchanging messages with the registration center. Therefore, the computational cost and the communication cost can be reduced, and the security is enhanced.

The anonymity authentication method in multi-server environments of the present disclosure can provide higher security than the conventional authentication method. In the following sections, the verification mechanisms between each participant in multi-server environments of the present disclosure are explained, and showing that the anonymity authentication method in multi-server environments of the present disclosure can overcome the disadvantages of the conventional authentication method and provide more protection to against the hacker's attack.

(a) Mutual Authentication and Session Key Establishment.

A Burrows-Abadi-Needham (BAN) logic method is widely used to prove the validity of authentication method and session key establishment. By a verification of the BAN logic method, the anonymity authentication method in multi-server environments of the present disclosure is proved to have good verification between the user and the remote server, and the session key can be effectively established.

(b) User Anonymity.

In the present disclosure, the data involved the user identity can only be obtainable by the specified remote server, and can't be obtained by the others. All transmitted messages are encrypted with random numbers, thus anonymity authentication is achieved. The user is untraceable by a hacker, thus high security is achieved.

(c) Two Factor Security.

In the present disclosure, when the user wants to finish performing mutual authentication with the remote server, the user identity, the password and the messages in the smart card are required. When the smart card of the user is lost or stolen, the hacker can't perform mutual authentication with the remote server only by the message in the smart card. Therefore, security can be guaranteed using the anonymity authentication method in multi-server environments of the present disclosure.

(d) Masquerade Attacks

In the anonymity authentication method of the present disclosure, a smart card is used for inputting the user identity and password in order to perform mutual authentication. In the conventional authentication method, when authenticating the login messages, all secret messages are obtainable without obtaining the password of the user. Therefore it is easily to suffer masquerade attacks. In the anonymity authentication method of the present disclosure, even if the hacker can obtain the messages in the smart card; he still can't obtain the password and the secret messages of the registration center. Thus, the hacker can't be able to forge an effective login requesting message to the remote server, and can't be forged to a legal user.

(e) Insider Attacks, Stolen Verifier Attacks, and Verification Tables.

In the anonymity authentication method of the present disclosure, the remote server and the registration center don't need to maintain a verification table; therefore a stolen verifier attack can be prevented. The password of the user is not directly used, but the password of the user is used with the random number for generating the first hash value, thus the insider in the registration center can't obtain the password of the user. Furthermore, the master key x is also unobtainable, because it is also a hash value. Therefore, the insider attacks can be blocked.

(f) Securely Chosen Password and Single Registration.

In the password-changing procedure of the present disclosure, even the hacker can obtain the smart card, he can't change the password due to the original user identity and the password are not obtainable. Moreover, in the present disclosure, the password-changing procedure only can be performed when the smart card, the original user identity and the original password are all available. Furthermore, the user can freely chose the password without efforts from the registration center, and the user only needs to register to the registration center once to use services from different remote servers. Therefore, a single registration can be achieved.

Compared to the conventional authentication methods, the anonymity authentication method of the present disclosure not only has higher security, but also has higher functionalities and computational efficiency. The following TABLE 2 and TABLE 3 demonstrate a comparison of the functionalities and computational efficiency of the present disclosure and the conventional cases. TABLE 2 shows the computational efficiency of the anonymity authentication method of the present disclosure, and TABLE 3 shows the functionalities of the anonymity authentication method of the present disclosure. Here the computational efficiency can be divided into the computational cost and the communication cost.

In the anonymity authentication method of the present disclosure, four procedures are involved, i.e., the registration procedure, the login procedure, the verification procedure (including verification steps and session key establishment) and a password-changing procedure. The demonstration of efficiency is mainly focused on the login procedure and the verification procedure, and the password-changing procedure is also introduced into discussion.

In TABLE 2, computational cost and communication cost of each step on the login procedure, the verification procedure and the password-changing procedure are showed, and are compared with the conventional authentication method. In the conventional authentication method, in addition to XOR operator and one-way hash function (hereinafter $T_h$), a symmetry encrypt/decrypt operation (hereinafter $T_{sym}$) or an exponential encrypt/decrypt operation (hereinafter $T_{exp}$) is also used. Commonly the computational cost for the XOR operation is very low and can be omitted here. However, the computational cost for the symmetry encrypt/decrypt operation or the exponential encrypt/decrypt operation is much higher.

In the anonymity authentication method of the present disclosure, only simple XOR operation and Hash function are utilized. Furthermore, a time complexity of the hash function is known as O(1), therefore, the anonymity authentication method of the present disclosure is very simple.

Concerning to the communication cost, as showed in TABLE 2, only three transmitted messages are used in the anonymity authentication method of the present disclosure. Therefore, the anonymity authentication method in multi-server environments of the present disclosure has high efficiency.

TABLE 2

| | The present disclosure | Case #1 | Case #2 | Case #3 | Case #4 | Case #5 |
|---|---|---|---|---|---|---|
| login and verification procedure computational cost | | | | | | |
| user | $11T_h$ | $10T_h$ | $10T_h$ | $9T_h$ | $3T_h + 3T_{sym}$ | $4T_{exp}$ |
| remote server | $8T_h$ | $8T_h$ | $9T_h$ | $7T_h$ | $3T_h + 6T_{sym}$ | $6T_{exp}$ |
| registration center | 0 | 0 | $5T_h$ | 0 | $1T_h + 2T_{sym}$ | 0 |
| sum | $19T_h$ | $18T_h$ | $24T_h$ | $16T_h$ | $7T_h + 11T_{sys}$ | $10T_{exp}$ |
| communication cost | | | | | | |
| transmitted messages | 3 | 3 | 5 | 3 | 5 | 1 |
| energy consumption | low | low | low | low | high | high |
| password-changing procedure computational cost | | | | | | |
| user | $5T_h$ | $5T_h$ | $5T_h$ | $5T_h$ | — | $4T_{exp}$ |
| remote server | 0 | 0 | 0 | 0 | — | 0 |
| registration center | 0 | $1T_h$ | 0 | 0 | — | 0 |
| sum | $5T_h$ | $6T_h$ | $5T_h$ | $5T_h$ | — | $4T_{exp}$ |
| communication cost | | | | | | |

TABLE 2-continued

| | The present disclosure | Case #1 | Case #2 | Case #3 | Case #4 | Case #5 |
|---|---|---|---|---|---|---|
| transsmitted messages | 0 | 2 | 0 | 0 | — | 0 |

TABLE 3 shows the functionalities of the anonymity authentication method of the present disclosure.

TABLE 3

| | The present disclosure | Case #1 | Case #2 | Case #3 | Case #4 | Case #5 |
|---|---|---|---|---|---|---|
| securely chosen password | yes | no | yes | yes | no | yes |
| no verification table | yes | yes | yes | yes | yes | yes |
| session key establishment | yes | yes | yes | yes | yes | no |
| mutual authentication | yes | no | no | no | yes | no |
| single registration | yes | yes | yes | yes | yes | yes |
| user anonymity | yes | yes | yes | yes | no | no |
| two factor security | yes | no | yes | no | no | no |
| Masquerade attacks blocking | yes | no | no | no | yes | yes |
| insider attacks blocking | yes | yes | yes | no | no | no |
| reparability | yes | no | no | no | yes | yes |

The anonymity authentication method of the present disclosure also provides much functionality that is deficient in the conventional authentication methods. The anonymity authentication method of the present disclosure is capable of blocking the masquerade attacks and the insider attacks, therefore has higher security than the conventional authentication methods.

The anonymity authentication method of the present disclosure performs the verification procedures by the smart card and is suitable for multi-server environment. Therefore, the inconvenient can be reduced. Furthermore, by verifying of a BAN logic method, the anonymity authentication method of the present disclosure is proved to have good mutual authentication and effective session key establishment procedure. Therefore, the anonymity authentication method of the present disclosure has higher security and better computational efficiency than the conventional authentication method.

Moreover, the anonymity authentication method of the present disclosure can block various kinds of attacks and provide higher security during message transmission, and also uses simpler operation. Therefore, the anonymity authentication method of the present disclosure has high security, much functionalities and high computational efficiency.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An anonymity authentication method in multi-server environments comprising:

a registration procedure for registering a user to a registration center, the registration procedure comprising:

in the user:
choosing an user identity (user ID), a password and randomly choosing a random number by the user;
performing an XOR operation to the random number and the password chosen by the user, and then performing a hash operation for generating a first hash value;
transmitting the user identity and the first hash value to the registration center by the user for performing the registration procedure;

in the registration center:
performing a hash operation to the first hash value for generating a second hash value;
performing a string concatenation to a master key and a secret number chosen by the registration center, and then performing a hash operation, and then performing a string concatenation with the second hash value, and finally performing a hash operation for generating a third hash value;
performing an XOR operation to the third hash value and the first hash value for generating first output value;
performing a hash operation to the user identity and the master key for generating a fourth hash value;
performing a string concatenation operation to the user identity and the first hash value, then performing a hash operation, and then performing an XOR operation with the fourth hash value for generating a second output value;
performing a hash operation to the fourth hash value for generating a fifth hash value;
performing a hash operation to the secret number for generating a sixth hash value;
the registration center transmitting the second output value, the first output value, the fifth hash value, a one-way hash value and the sixth hash value to a smart card of the user;
the user inputting the random number to the smart card, and the smart card containing the second output value, the first output value, the fifth hash value, the random number, the one-way hash value and the sixth hash value;

a login procedure for the user to login to a remote server, the login procedure comprising:
the user inputting the user identity and the password chosen by the user to the smart card;
at the smart card:
performing an XOR operation and then a hash operation to the random number and the password, then performing a string concatenation operation with the user identity, then performing a hash operation, and then performing an XOR operation with the second output value for generating a third output value;
performing a hash operation to the third output value for generating a seventh hash value;
comparing the seventh hash value with the fifth hash value, if the seventh hash value is equal to the fifth hash value, the user is authenticated, if the seventh hash value is not equal to the fifth hash value, the smart card rejects the login procedure, if the seventh hash value is equal to the fifth hash value, then at the smart card:

generating a user nonce;
performing an XOR operation to the first hash value and the first output value for generating a fourth output value;
performing a hash operation to the first hash value for generating an eighth hash value;
performing a string concatenation operation and then a hash operation to the sixth hash value, the user nonce and a remote server identity, and then performing an XOR operation with the eighth hash value for generating a fifth output value;
performing a string concatenation operation and then a hash operation to the third output value, the fourth output value and the user nonce, and then performing an XOR operation with the first hash value for generating a dynamic user identity;
performing a hash operation to the remote server identity, the user nonce and the fourth output value, and then performing an XOR operation with the third output value for generating a sixth output value;
performing a string concatenation operation and then a hash operation to the first output value, the fourth output value and the user nonce for generating a ninth hash value;
issuing a first parameter set to the remote server by the user, wherein the first parameter set comprises the dynamic user identity, the fifth output value, the sixth output value, the ninth hash value and the user nonce;

a verification procedure for performing a mutual authentication between the user and the remote server, comprising:
receiving the first parameter set by the remote server;
in the remote server:
performing an string concatenation operation and then a hash operation to the sixth hash value, the user nonce and the remote server identity, and then performing an XOR operation with the fifth output value for generating a seventh output value;
performing a string concatenation operation and then a hash operation to the master key and the secret number selected by the registration center, and then performing a string concatenation operation with the seventh output value, and then performing a hash operation for generating a tenth hash value;
performing a string concatenation operation and then a hash operation to the tenth hash value, the user nonce and the remote server identity, and then performing an XOR operation with the sixth output value for generating an eighth output value;
performing a string concatenation operation and then a hash operation to the eighth output value, the tenth hash value and the user nonce, and then performing an XOR operation with the dynamic user identity for generating a eleventh hash value;
performing an XOR operation to the eleventh hash value and the tenth hash value for generating a ninth output value;
performing a string concatenation operation and then a hash operation to the ninth output value, the tenth hash value and the user nonce for generating a twelfth hash value;
comparing the twelfth hash value with the ninth hash value, if the twelfth hash value is not equal to the ninth hash value, the remote server rejects the login procedure, if the twelfth hash value is equal to the ninth hash value, then performing the following procedures:

generating a remote server nonce by the remote server, and performing a string concatenation operation and then a hash operation to the ninth output value, the user nonce, the tenth hash value and the remote server identity for generating a thirteenth hash value;

transmitting a second parameter set to the user by the remote server, wherein the second parameter set comprises the thirteenth hash value and the remote server nonce;

after receiving the second parameter set, the user performing the following procedures for authenticating the remote server:

performing a string concatenation operation and then a hash operation to the first output value, the user nonce, the fourth output value and the remote server identity for generating a fourteenth hash value;

comparing the fourteenth hash value with the thirteenth hash value, if the fourteenth hash value is not equal to the thirteenth hash value, the user rejects to receive the second parameter set, if the fourteenth hash value is equal to the thirteenth hash value, the remote server identity is authenticated, and then performing the following procedures:

performing, a string concatenation operation and then a hash operation to the first output value, the remote server nonce, the fourth output value and the remote server identity for generating a fifteenth hash value;

transmitting a third parameter set to the remote server by the user, wherein the third parameter set comprises the fifteenth hash value;

after receiving the third parameter set by the remote server, the remote server performing the following procedures for authenticating the user:

performing a string concatenation operation and then a hash operation to the ninth output value, the remote server nonce, the tenth hash value and the remote server identity for generating a sixteenth hash value;

comparing the sixteenth hash value with the fifteenth hash value, if the sixteenth hash value is not equal to the fifteenth hash value, the remote server rejects to receive the third parameter set, and terminates a session between the remote server and the user; if the sixteenth hash value is equal to the fifteenth hash value, the user is authenticated;

after finishing the mutual verification procedure between the user and the remote server, a session key is established between the user and the remote server, wherein the session key of the remote server is obtained by performing a string concatenation operation and then a hash operation to the ninth output value, the user nonce, the remote server nonce, the tenth hash value and the remote server identity; and the session of the user is obtained by performing a string concatenation operation and then a hash operation to the first output value, the user nonce, the remote server nonce, the fourth output value and the remote server identity.

2. The anonymity authentication method of claim 1, further comprising a password-changing procedure for the user if he wants to change the password, the password-changing procedure comprising:

inputting the user identity and the password by the user;

performing an XOR operation and then a hash operation to the random number and the password, and then performing a string concatenation operation and then a hash operation with the user identity, and then performing an XOR operation with the second output value for generating a tenth output value;

performing a hash operation to the tenth output value for generating a seventeenth hash value;

comparing the seventeenth hash value and the fifth hash value, if the seventeenth hash value is not equal to the fifth hash value, the smart card rejects the password-changing procedure; if the seventeenth hash value is equal to the fifth hash value, the user is authenticated, and performing the following procedures;

freely selecting a new password and a new random number by the user;

performing an XOR operation and then a hash operation to the new password and the new random number, and then performing a string concatenation operation and then a hash operation with the user identity, and then performing an XOR operation with the tenth output value by the smart card for generating a eleventh output value;

performing an XOR operation and then a hash operation to the new password and the new random number; and performing an XOR operation and then a hash operation to the password and the random number, and mutually performing an XOR operation to the first output value and the aforementioned values for generating a twelfth output value;

replacing the second output value, the first output value and the random number originally contained in the smart card to the eleventh output value, the twelfth output value, the new random number, and the smart card containing the eleventh output value, the twelfth output value, the fifth hash value, the new random number, the one-way hash value and the sixth hash value.

3. The anonymity authentication method of claim 1, wherein the registration procedure between the user and the registration center is performed through a secure channel.

4. The anonymity authentication method of claim 1, wherein the login procedure and the verification procedure between the user and the remote server is performed through a common channel.

5. The anonymity authentication method of claim 1, wherein the registration center is a computer with storage functionality.

6. The anonymity authentication method of claim 1, wherein the remote server is a computer with storage ftmctionality.

7. The anonymity authentication method of claim 1, wherein the smart card is a chip card with multi-functionalities.

* * * * *